United States Patent [19]
Arai

[11] Patent Number: 5,764,439
[45] Date of Patent: Jun. 9, 1998

[54] CASSETTE TAPE DRIVING DEVICE

[75] Inventor: Susumu Arai, Tokyo, Japan

[73] Assignee: Asahi Corporation, Tokyo, Japan

[21] Appl. No.: 822,411

[22] Filed: Mar. 21, 1997

[30] Foreign Application Priority Data

Mar. 22, 1996 [JP] Japan ................... 8-066671

[51] Int. Cl.$^6$ ............... G11B 5/54; G11B 21/22
[52] U.S. Cl. ................................... 360/105
[58] Field of Search ......................... 360/105

[56] References Cited

U.S. PATENT DOCUMENTS

| | | | |
|---|---|---|---|
| 4,646,174 | 2/1987 | Hayashi et al. | 360/105 |
| 5,018,032 | 5/1991 | Otsuki | 360/105 |
| 5,036,407 | 7/1991 | Yoshida et al. | 360/105 |
| 5,214,551 | 5/1993 | Kaneda | 360/105 |
| 5,307,221 | 4/1994 | Mikawa et al. | 360/105 |
| 5,349,488 | 9/1994 | Shibata et al. | 360/105 |
| 5,351,157 | 9/1994 | Kunze et al. | 360/105 |
| 5,377,061 | 12/1994 | Yoshimura | 360/105 |
| 5,402,289 | 3/1995 | Hayashi et al. | 360/105 |

*Primary Examiner*—Robert S. Tupper
*Attorney, Agent, or Firm*—Ostrolenk, Faber, Gerb & Soffen, LLP

[57] ABSTRACT

An arm 17 adapted to swing with its one end 17a pressed by a protrusion 12 made by protruding the axle of an idle gear 10 is disposed under a body chassis 1. A plate slide lever 18 adapted to horizontally move forward and backward by the swing of the other end 17b of the arm 17 is disposed at the other end 17b of the arm 17. A guide channel 20 is provided in the slide lever 18. The guide channel 20 includes a guide portion adapted to guide a pin 19 so as to vertically move the head base 8. An upper end lock portion 22 adapted to lock the head base 8 at its elevated position by means of the pin 19 and a lower end lock portion 23 adapted to lock the head base 8 at its elevated position by means of the pin 19 are provided at both ends of the guide channel 20. The head base can be vertically moved smoothly and can be firmly locked at predetermined positions.

4 Claims, 8 Drawing Sheets

CASSETTE TAPE DRIVING DEVICE

BACKGROUND OF THE INVENTION

1. Field of the Invention

The present invention relates to a locking mechanism for a head base which moves a magnetic head for recording and reproducing forward and backward opposite to a cassette tape.

2. Discussion of Related Art

The cassette tape driving device must allow the magnetic head to contact or detach from the surface of the cassette tape in order to effect a needed switch between modes such as recording, reproducing, rewind, rapid traverse and stop. Thus, it is essential to move the head base provided with the magnetic head forward and backward and also to lock the same at preselected positions.

Devices capable of meeting the above requirements are known, which include one disclosed in, for example, Japanese Patent Laid-open Specification No. 298557/1989. In the device disclosed in Japanese Patent Laid-open Specification No. 298557/1989, referring to FIG. 7, a pulley is driven by a motor 42 to thereby rotate. This rotation rotates a fly pulley 48 through the medium of a belt 46. A gear 49 fixed coaxially with the fly pulley 48 rotates and this rotation is conveyed to an idle gear 51 secured to a rotationally movable 54. The idle gear 51 rotates while engaging with an internal gear 55 and moves along the internal face of the internal gear 55.

Figure 7:
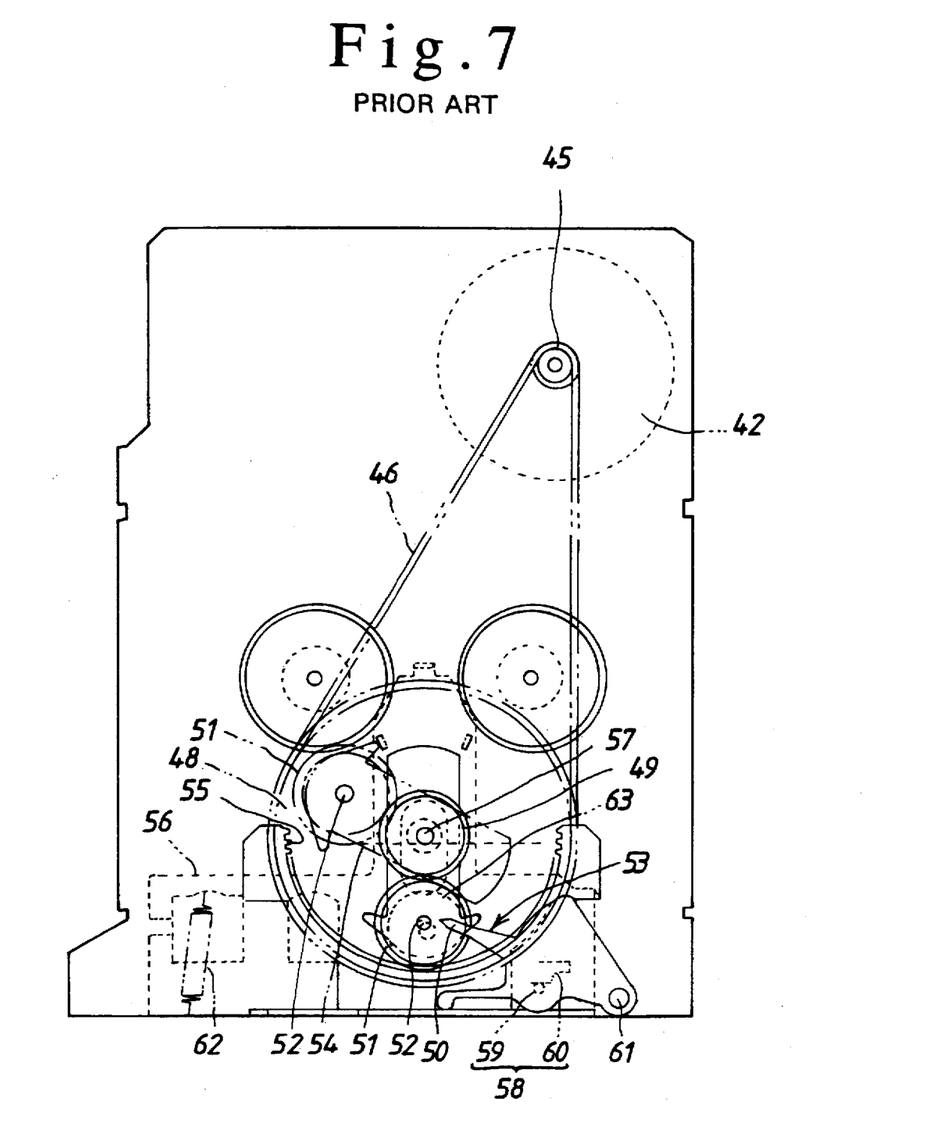
FIG. 7 is an explanatory view given to illustrate the operation of the conventional cassette tape driving device.

A protrusion 52 made by protruding the axle of the idle gear 51 is brought into contact with a head portion 50 of a play arm 53 which rotates round a shaft 61, so that the protrusion 52 is raised to a predetermined position. At this position, a pin 59 is fitted in a recess 60 of a lock mechanism 58 mounted on a head base 56 to thereby maintain the lock mode.

However, because the lock mechanism 58 is mounted on the head base 56 in order to maintain the lock mode, the positioning of the head base 56 depends on another component with the result that positioning accuracy is deteriorated. For example, when the head base 56 has been raised to an uppermost end, the periphery of a rubber-made pinch roller 63 is brought into contact with a capstan shaft 57, so that such an effect that the head base 56 having overelevated is restored to a normal position by the elasticity of the pinch roller 63 and the reaction force of a spring 62 with the result that the pin 59 is fitted in the recess 60 of the lock mechanism 58. Therefore, the device disclosed in Japanese Patent Laid-open Specification No. 298557/1989 would have the problem that the locking position is likely to have poor precision because of the wear and deformation of the rubber and that the pin 59 is likely to come off from the recess 60.

SUMMARY OF THE INVENTION

The present invention has been made with a view toward resolving the above problem. Therefore, it is an object of the present invention to provide a cassette tape driving device by which the head base can be vertically moved smoothly and can be firmly locked at predetermined positions.

The foregoing and other objects, features and advantages of the present invention will become apparent from the following detailed description and appended claims taken in connection with the accompanying drawings.

BRIEF DESCRIPTION OF THE DRAWINGS

In the drawings:

FIGS. 6 (a), 6 (b) and 6 (c) are explanatory views given to illustrate the operation of a cassette tape driving device having a lock mechanism built therein according to another embodiment of the present invention.

DETAILED DESCRIPTION OF THE INVENTION

For attaining the above objects, the cassette tape driving device of the present invention includes:

an intermediate pulley, a fixed gear fixed coaxially and integrally with the intermediate pulley, a rotationally movable lever rotatably secured coaxially with the intermediate pulley, an idle gear secured to the rotationally movable lever, the above idle gear engaging with the fixed gear, a protrusion made by protruding an axle of the idle gear, an internal gear engaging with the idle gear, the above internal gear being adapted to rotationally move the idle gear, a head base capable of vertically moving a magnetic head, and a motor capable of rotating the intermediate pulley through the medium of a belt, which cassette tape driving device is provided with a lock mechanism comprising:

a shaft secured to one side of a body chassis, an arm adapted to swing round the shaft with one end of the arm pressed by the protrusion made by protruding the axle of the idle gear, and a slide lever adapted to horizontally move forward and backward by the swing of the other end of the arm, said slide lever having a guide channel capable of vertically moving the head base forward and backward, said guide channel having lock parts enabling locking of the head base at preselected positions.

In the above cassette tape driving device, it is preferred that the above guide channel include:

a guide portion having a grade adapted to vertically move the head base, an upper end lock portion comprising an upper end portion at which the head base is positioned at a predetermined point by the vertical upward move through the guide portion, the above upper end portion being defined by a substantially horizontal upper side of channel, a lower side formed opposite to the upper side with a downward grade descending to the side of the guide portion and a protrusion with an upward grade extending from a lower end of the downward grade to a point of contact of the upward grade with the guide portion, and a lower end lock portion comprising a lower end portion at which the head base is positioned at a predetermined point by the vertical downward move through the guide portion, the above upper end portion being defined by a substantially horizontal upper side of channel and a lower side formed opposite to the upper side with a downward grade descending to the guide portion.

In the above cassette tape driving device, further, it is preferred that the above arm be provided with a branch adapted to be stopped by the protrusion of the idle gear so that the head base is prevented from becoming locked by such external shock that the slide lever is freed to thereby move to the head base locking portions.

In the present invention, the slide lever per se is so constructed as to horizontally slide while being guided by a channel formed in the body chassis. Thus, no positional error occurs in the vertical direction of the slide lever. Moreover, the vertical movement and positioning locking of the head base can be securely performed with high precision because the pin provided on the head base is guided under the restraint imposed by the guide channel provided on the slide lever.

PREFERRED EMBODIMENT OF THE INVENTION

The present invention will now be described in greater detail with reference to the following Embodiments, which should not be construed as limiting the scope of the invention.

Figure 1:
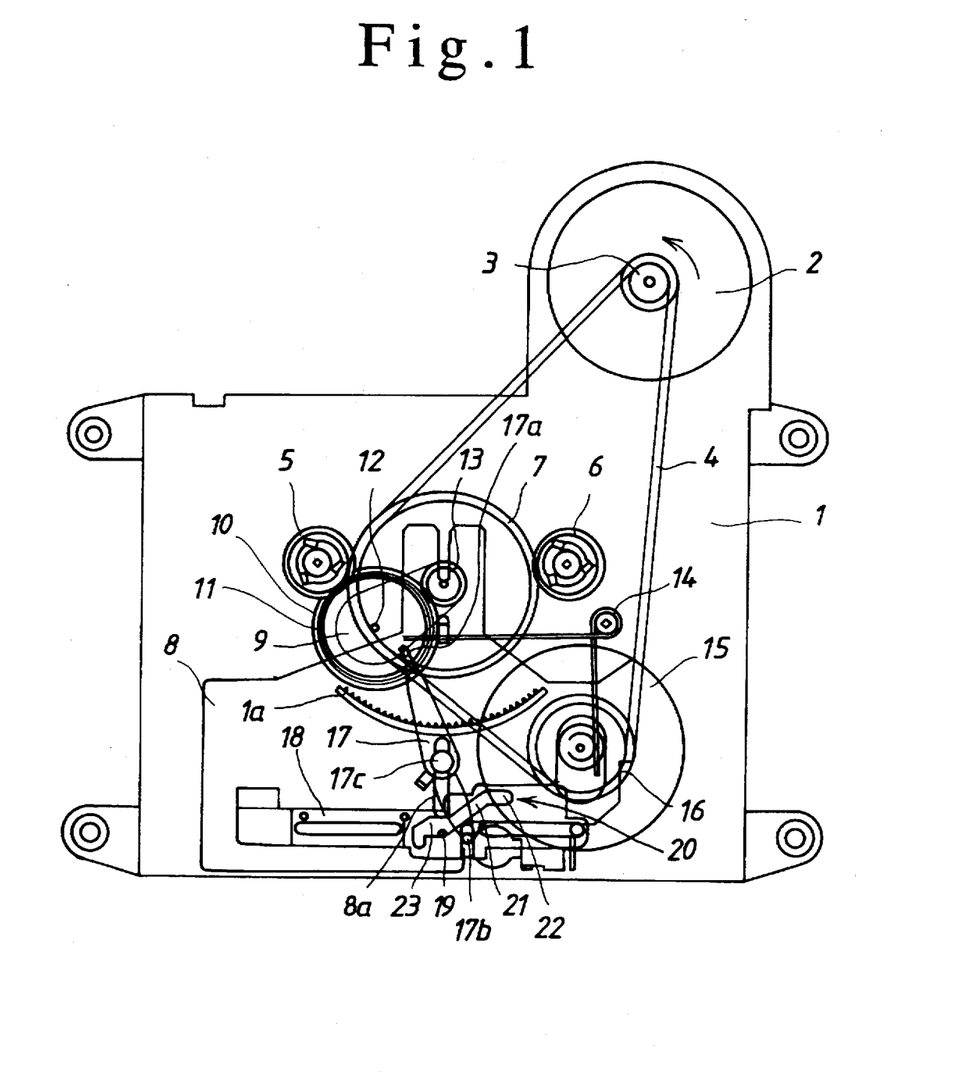
FIG. 1 is a front view of a cassette tape driving device having a lock mechanism built therein according to one embodiment of the present invention.
Figure 2:
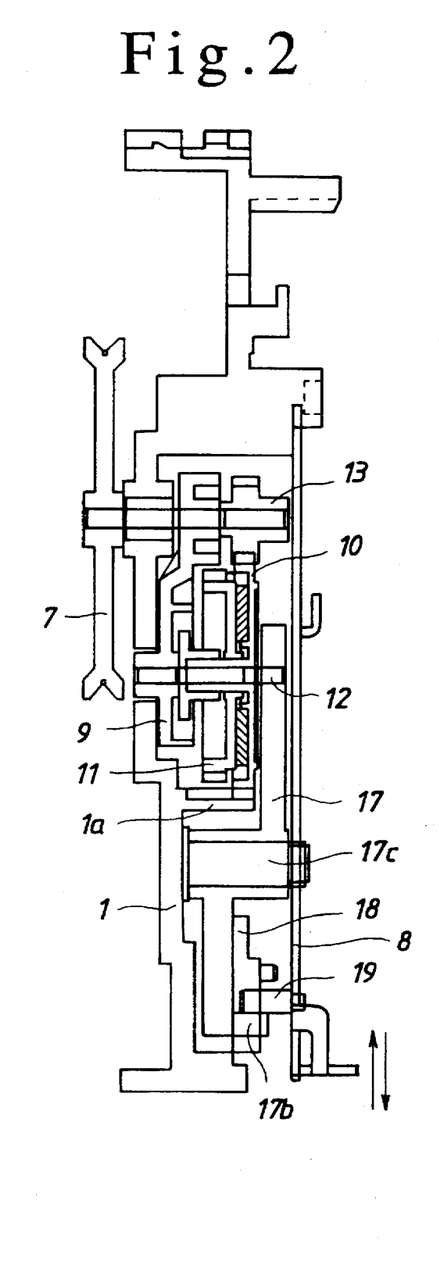
FIG. 2 is a sectional view of the above cassette tape driving device.
Figure 3:
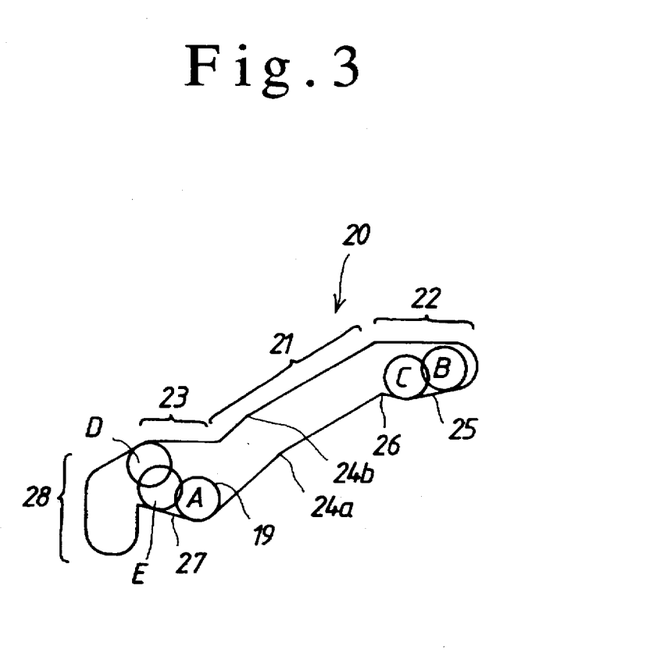
FIG. 3 is a view showing the configuration of a guide channel provided in a slide lever of the above cassette tape driving device.
Figure 4:
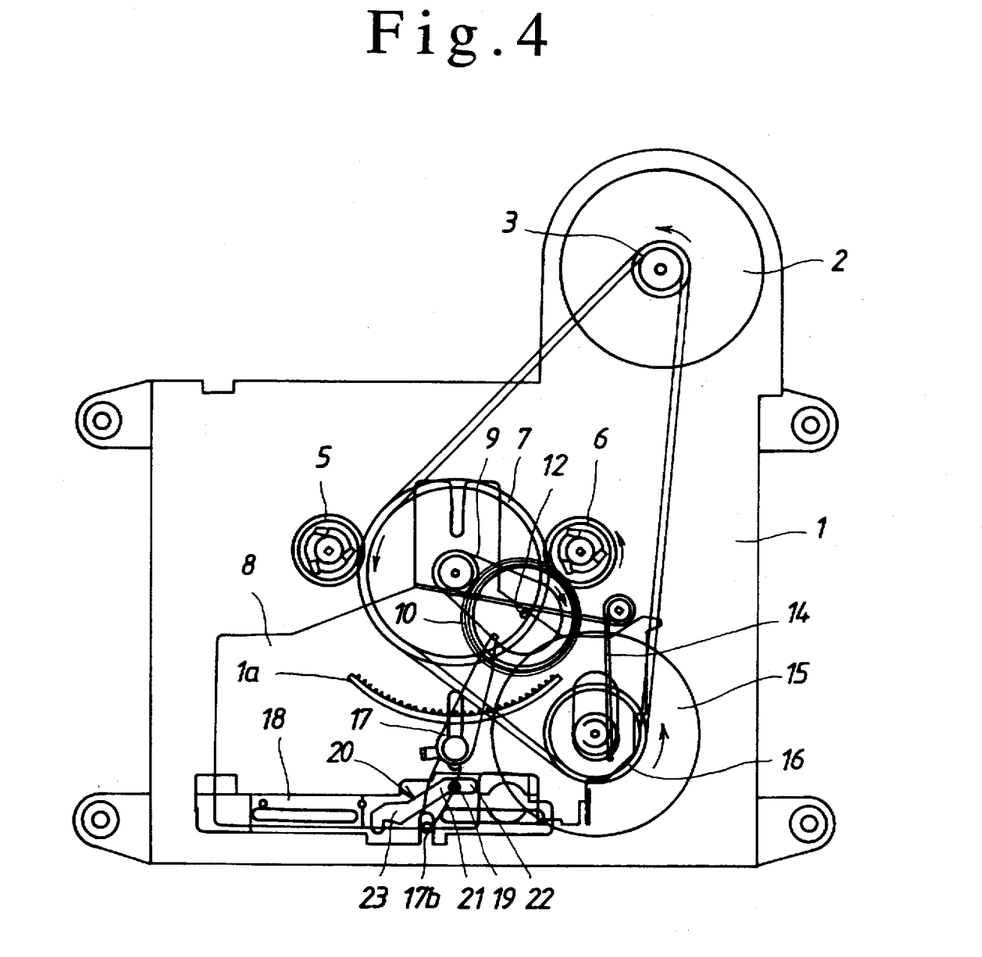
FIG. 4 is an explanatory view given to illustrate the operation of the above cassette tape driving device.
Figure 5:
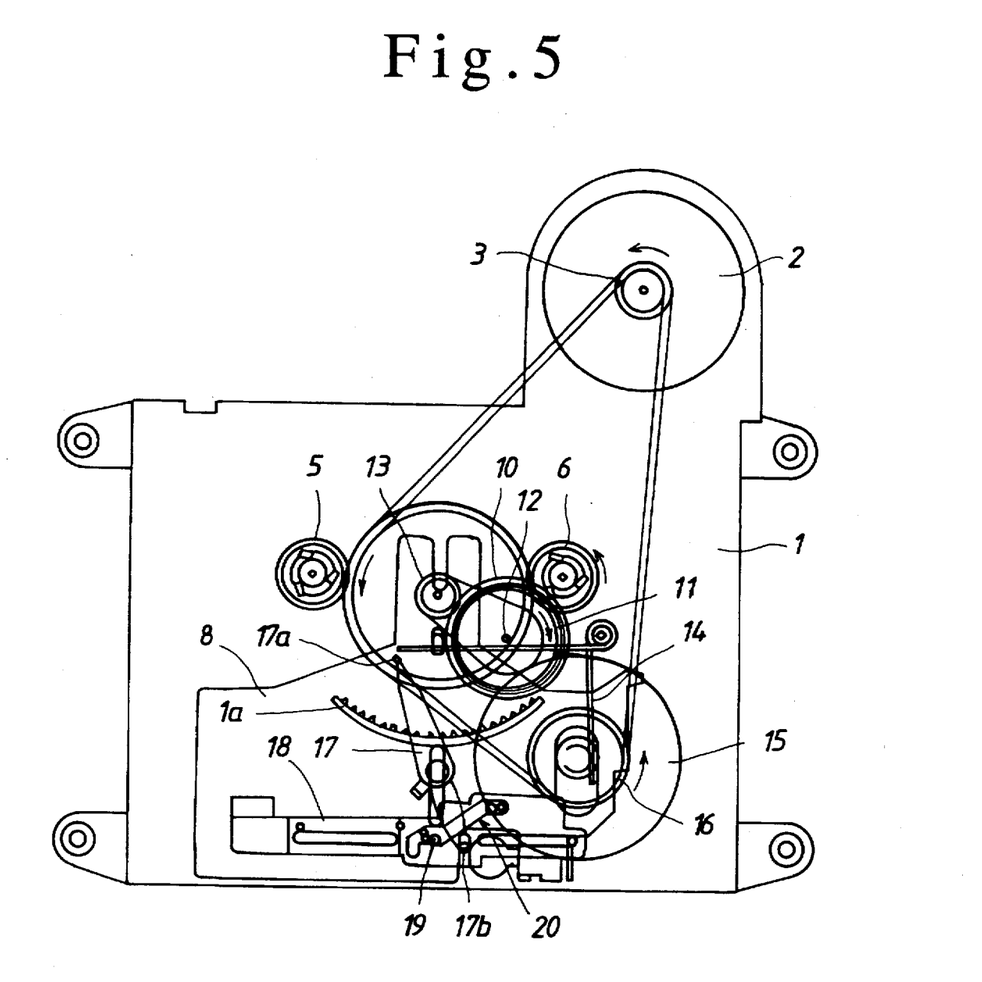
FIG. 5 is another explanatory view given to illustrate the operation of the above cassette tape driving device.

One embodiment of the present invention will be described with reference to FIGS. 1 to 5, in which FIG. 1 is a front view of a cassette tape driving device having a lock mechanism built therein according to the present invention; FIG. 2 is a sectional view of the above cassette tape driving device; FIG. 3 is a view showing the configuration of a guide channel provided in a slide lever of the above cassette tape driving device; and FIGS. 4 and 5 are explanatory views given to illustrate the operation of the above cassette tape driving device.

Referring to FIG. 1, the cassette tape driving device having a lock mechanism built therein according to one embodiment of the present invention is provided with a motor 2 at one upper corner of one face of a body chassis 1, the motor 2 having a pulley 3 coaxially secured thereto. A flywheel pulley 16 and an intermediate pulley 7 which are simultaneously rotated by the drive of the motor 2 through the medium of a belt 4 are arranged below the motor 2. A flywheel 15 is integrally secured coaxially with the flywheel pulley 16 and a fixed gear 13 is integrally secured coaxially with the intermediate pulley 7.

A rotationally movable lever 9 is rotatably disposed coaxially with the intermediate pulley 7, and an idle gear 10 engaging with a fixed gear 13 and a reel gear 11 adapted to contact and depart from a rewind reel gear 5 are secured to the rotationally movable lever 9. The idle gear 10 is provided with a protrusion 12 made by protruding the axle of the idle gear 10 above the gear face and is so arranged as to be rotationally movable along the circular arc of an internal gear 1a while engaging with the internal gear 1a.

The head base 8 is so arranged as to enable vertically, opposite to the tape face, moving a magnetic head fixed on one surface of the head base 8 on its side of the body chassis 1, with the above surface being downward pressed by means of a spring 14, by means of a channel 8a provided in the head base 8 and a shaft 17c fixed on the body chassis 1.

In this structure of the cassette tape driving device of the present invention, an arm 17 which is adapted to swing round the shaft 17c fixed on one side of the body chassis with one end 17a of the arm 17 pressed by the protrusion 12 made by protruding the axle of the idle gear 10 is disposed below the idle gear 10. A slide lever 18 which locks the other end 17b of the arm 17 and which is adapted to horizontally move forward and backward by the swing of the arm 17 is disposed under the arm 17.

This slide lever 18 has the form of a plate and is buried in a channel of the body chassis 1. This channel has side walls which guide the slide lever 18 in the horizontal forward and backward move of the slide lever 18. This slide lever 18 is provided with a guide channel 20 capable of vertically moving the head base 8 while guiding a positioning pin 19 fixed on the head base 8 in accordance with the horizontal forward and backward move of the slide lever 18.

Referring now to FIG. 3, the guide channel 20 provided in the slide lever 18 has a portion designated 21 which is a guide portion capable of guiding the positioning pin 19 to thereby vertically move the head base 8. This guide portion 21 is provided with two-stage grades which are obliquely upward with respect to the horizontal plane. A sharp grade is provided from a downward point to points 24a, 24b and a less sharp grade is provided from points 24a, 24b to an upward point. As a result, the speed of upward and downward motion of the head base 8 is so set as to be very rapid from a downward point to points 24a, 24b and less rapid from points 24a, 24b to an upward point.

Portion designated 22 is a position at which the head base 8 has reached its top dead center and is an upper end lock portion at which the position of the head base 8 is fixed by means of the pin 19. This lock portion 22 comprises a horizontal upper inside wall of channel 20, a lower inside wall with a downward grade 25 descending to the side of the guide portion 21 and a protrusion 26 with a slight projection which has a reverse (upward) grade extending from a lower end of the downward grade 25 to a point of contact of the upward grade with the guide portion 21.

On the other hand, portion designated 23 which is arranged at a lower end of the guide portion 21 is a position at which the head base 8 has reached its bottom dead center and is a lower end lock portion at which the position of the head base 8 is fixed by means of the positioning pin 19. This lock portion 23 comprises a horizontal upper side of channel 20 and a lower side with a downward grade 26 descending to the guide portion 21.

In the above structure, a bent portion designated 28 which is arranged at a left end of the lower end lock portion 23 is a positioning channel for assembly which is used at the time of mounting the head base 8.

The operation of the cassette tape driving device with the above structure will be described below.

The cassette tape driving device shown in FIG. 1 exhibits the mode of pause or rewind. As shown in FIG. 3, not only is the pin 19 locked at position A of the guide channel 20 but also the reel gear 11 engages with the rewind reel gear 5.

When, in the above state, the motor 2 is rotated in the arrowed direction, the motor pulley 3, the flywheel pulley 16 and the intermediate pulley 7 are simultaneously rotated through the medium of the belt 4. The rotation of the intermediate pulley 7 is conveyed to the fixed gear 13 fixed coaxially with the intermediate pulley 7 and then to the idle gear 10 secured to the rotationally movable lever 9. The idle gear 10 starts to rotate on the internal gear 1a to thereby move right.

Then, the protrusion 12 made by protruding the axle of the idle gear 10 is brought into contact with the one end 17a of the arm 17 which is adapted to swing round the shaft 17c, thereby pushing the one end 17a down to the right. As a result, the slide lever 18 is slid left by the other end 17b of the arm 17.

The pin 19 fixed on the head base 8 is guided by the guide channel 20 with an obliquely upward grade in accordance with the slide of the slide lever 18 toward the left, so that the head base 8 is moved upward. Referring to FIG. 4, even after pushing the one end 17a of the arm 17 down to the right, the idle gear 10 still simultaneously advances, so that the protrusion 12 is detached and departed from the one end 17a of the arm 17 and that the idle gear 10 reaches a right end of the internal gear 1a.

At that time, the pin 19 is placed in the guide channel 20 at position B as indicated in FIG. 3, i.e., the rightmost point, so that the upward move of the pin 19 is restricted by the horizontal upper side of the lock portion 22. At this position, the protrusion 12 of the idle gear 10 is already detached from the one end 17a of the arm 17, so that the upward and downward move of the head base 8 becomes free and the head base 8 is pushed to descend by means of the spring 14 with the result that the pin 19 descends from position B to position C of the downward grade portion 25. This position C corresponds to a valley made by the protrusion 23 and the downward grade portion, so that the pin 19 falls in the state of being unable to horizontally move and is locked. Thus, a magnetic head, not shown, secured to the head base 8 is brought into contact with the surface of the cassette tape, so that the mode of recording or reproducing can be maintained.

When the motor 2 is rotated in the reverse direction in the state of having the pin 19 locked in the position C, the idle gear 10 also has the reverse rotation and again starts to move while engaging with the internal gear 1a. Thus, the idle gear 10 moves left. Then, the protrusion 12 made by protruding the axle of the idle gear 10 is brought into contact with the one end 17a of the arm 17 in the direction reverse to the previous direction, thereby pushing the one end 17a down to the left. As a result, the pin 19 having been locked in the lock portion 22 gets over the protrusion 26 to thereby move into the guide portion 21 and is pushed to descend in accordance with the grade of the guide portion 21. Accordingly, the head base 8 is caused to descend.

When, in that situation, the protrusion 12 is returned right immediately before the protrusion 12 completely pushes down the one end 17a of the arm 17, referring to FIG. 3, the pin 19 is guided while being pressed against the oblique face of upper side of the guide portion 21 to thereby reach the position D and is further pushed by the spring 14 to descend via the position E to the position A on the downward grade portion 27. This position A corresponds to a valley made by the downward grade portion 27 and the guide portion 21, so that the pin 19 falls in the state of being unable to horizontally move and is locked. Thus, referring to FIG. 5, a magnetic head, not shown, secured to the head base 8 is brought into the state of departing from the tape surface, so that the mode of rapid traverse in which the reel gear 11 engages with the play reel gear 6 can be maintained.

When the idle gear 10 moves left to thereby cause the protrusion 12 to push down the one end 17a of the arm 17 and further moves to the left end with the protrusion 12 detached from the arm 17, in this situation, the upward and downward move of the head base 8 becomes free. Thus, the head base 8 is pushed to descend by the spring 14 and, referring to FIG. 3, the pin 19 is moved to the leftist position D of the guide portion 21. Thereafter, the head base 8 is pushed to descend by means of the spring 14, so that the pin 19 is returned via position E to the position A on the downward grade portion 27 and locked. Accordingly, the mode of stop or rewind as shown in FIG. 1 can be maintained.

Another embodiment of the present invention will be described with reference to FIGS. 6 (a), 6 (b) and 6 (c).

In this cassette tape driving device, referring to FIG. 6(a), the arm 17 is provided with a branched end 17a adapted to be stopped by the protrusion 12 of the idle gear 10 so that the head base 8 is prevented from becoming locked by such external shock that the slide lever 18 is freed to thereby move to a head base locking portion.

Figure 6:
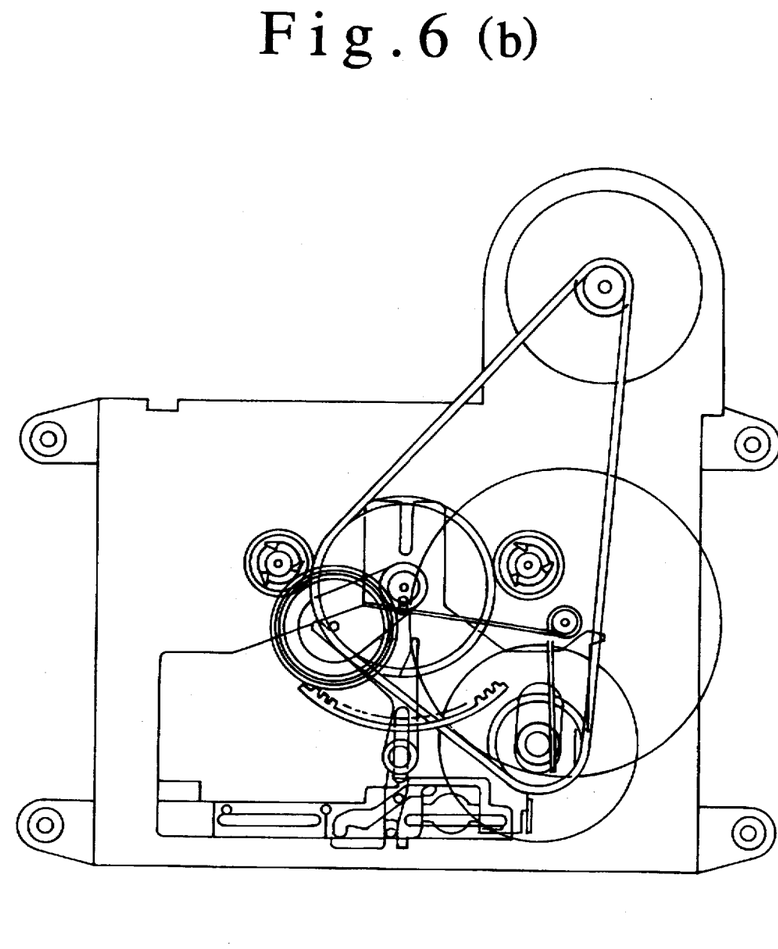
Figure 6A:
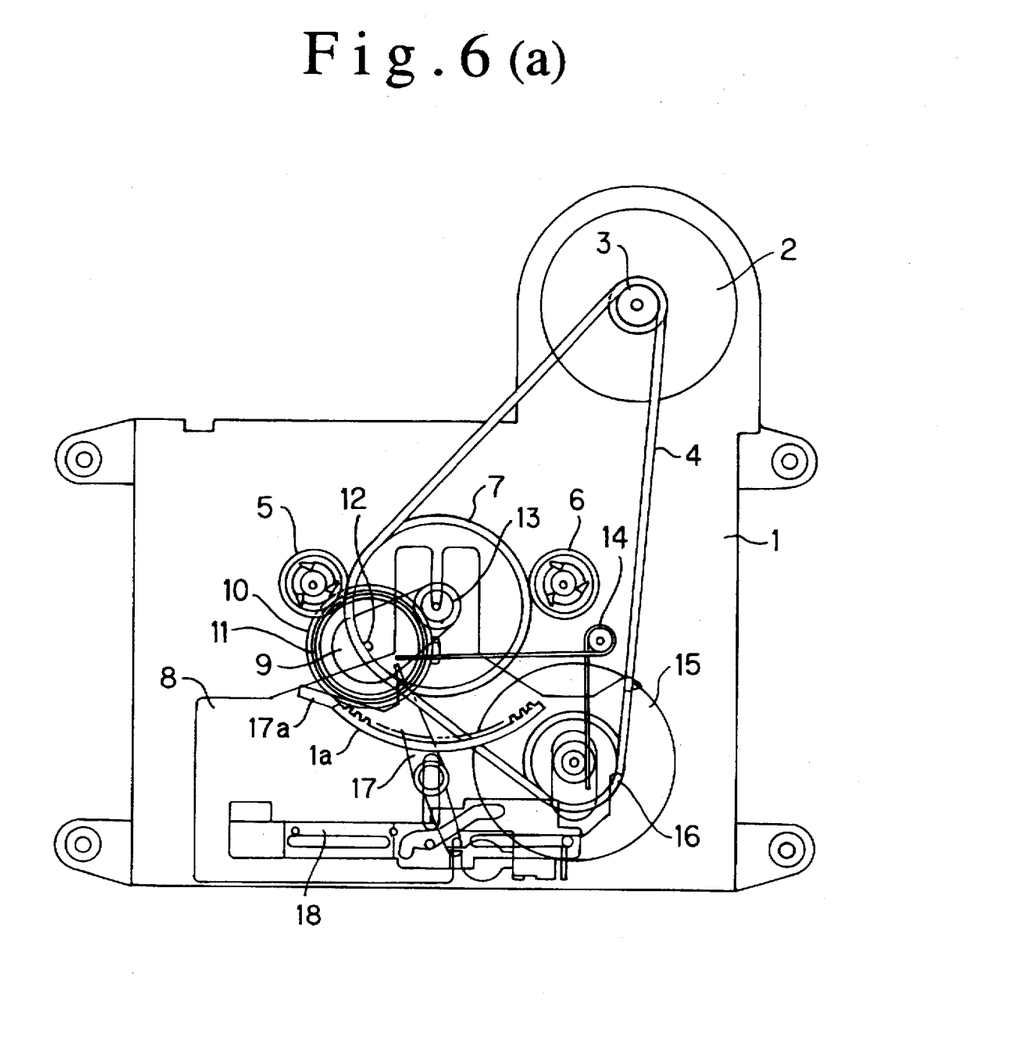

For comparison, FIGS. 6 (b) and 6 (c) are given which show the use of the branched end 17a and the nonuse thereof, respectively. In FIG. 6 (b), the branched end 17a is stopped by the protrusion 12 of the idle gear 10 to thereby prevent the head base 8 from moving to a head base locking portion. In FIG. 6 (c), the end 17a of the arm 17 is not branched, so that the stopping by the protrusion 12 of the idle gear 10 cannot be realized.

The described present invention enables performing the upward and downward move of the head base 8 by the guide of the guide channel 20 provided in the slide lever 18 and enables securely locking the head base 8 at upper and lower positions by the lock portions provided at both ends of the guide channel 20. Therefore, the positioning accuracy of the magnetic head is enhanced by the present invention.

What is claimed is:

1. A cassette tape driving device including:

an intermediate pulley, a fixed gear fixed coaxially and integrally with the intermediate pulley, a rotationally movable lever rotatably secured coaxially with the intermediate pulley, an idle gear secured to the rotationally movable lever, said idle gear engaging with the fixed gear, a protrusion made by protruding an axle of the idle gear, an internal gear engaging with the idle gear, said internal gear being adapted to rotationally move the idle gear, a head base capable of vertically moving a magnetic head, and a motor capable of rotating the intermediate pulley through the medium of a belt, which cassette tape driving device is provided with a lock mechanism comprising:

a shaft secured to one side of a body chassis, an arm adapted to swing round the shaft with one end of the arm pressed by the protrusion made by protruding the axle of the idle gear, and a slide lever adapted to horizontally move forward and backward by the swing of the other end of the arm, said slide lever having a guide channel capable of vertically moving the head base forward and backward, said guide channel having lock parts enabling locking of the head base at preselected positions.

2. The cassette tape driving device according to claim 1, wherein said guide channel includes:

a guide portion having a grade adapted to vertically move the head base, an upper end lock portion comprising an upper end portion at which the head base is positioned at a predetermined point by the vertical upward move through the guide portion, said upper end portion being defined by a substantially horizontal upper side of channel, a lower side formed opposite to the upper side with a downward grade descending to the side of the guide portion and a protrusion with an upward grade extending from a lower end of the downward grade to a point of contact of the upward grade with the guide portion, and a lower end lock portion comprising a lower end portion at which the head base is positioned at a predetermined point by the vertical downward move through the guide portion, said upper end portion being defined by a substantially horizontal upper side of channel and a lower side formed opposite to the upper side with a downward grade descending to the guide portion.

3. The cassette tape driving device according to claim 1, wherein said arm is provided with a branched end adapted to be stopped by the protrusion of the idle gear so that the head base is prevented from becoming locked by such external shock that the slide lever is freed to thereby move to a head base locking portion.

4. The cassette tape driving device according to claim 2, wherein said arm is provided with a branched end adapted to be stopped by the protrusion of the idle gear so that the head base is prevented from becoming locked by such external shock that the slide lever is freed to thereby move to a head base locking portion.

* * * * *